UNITED STATES PATENT OFFICE.

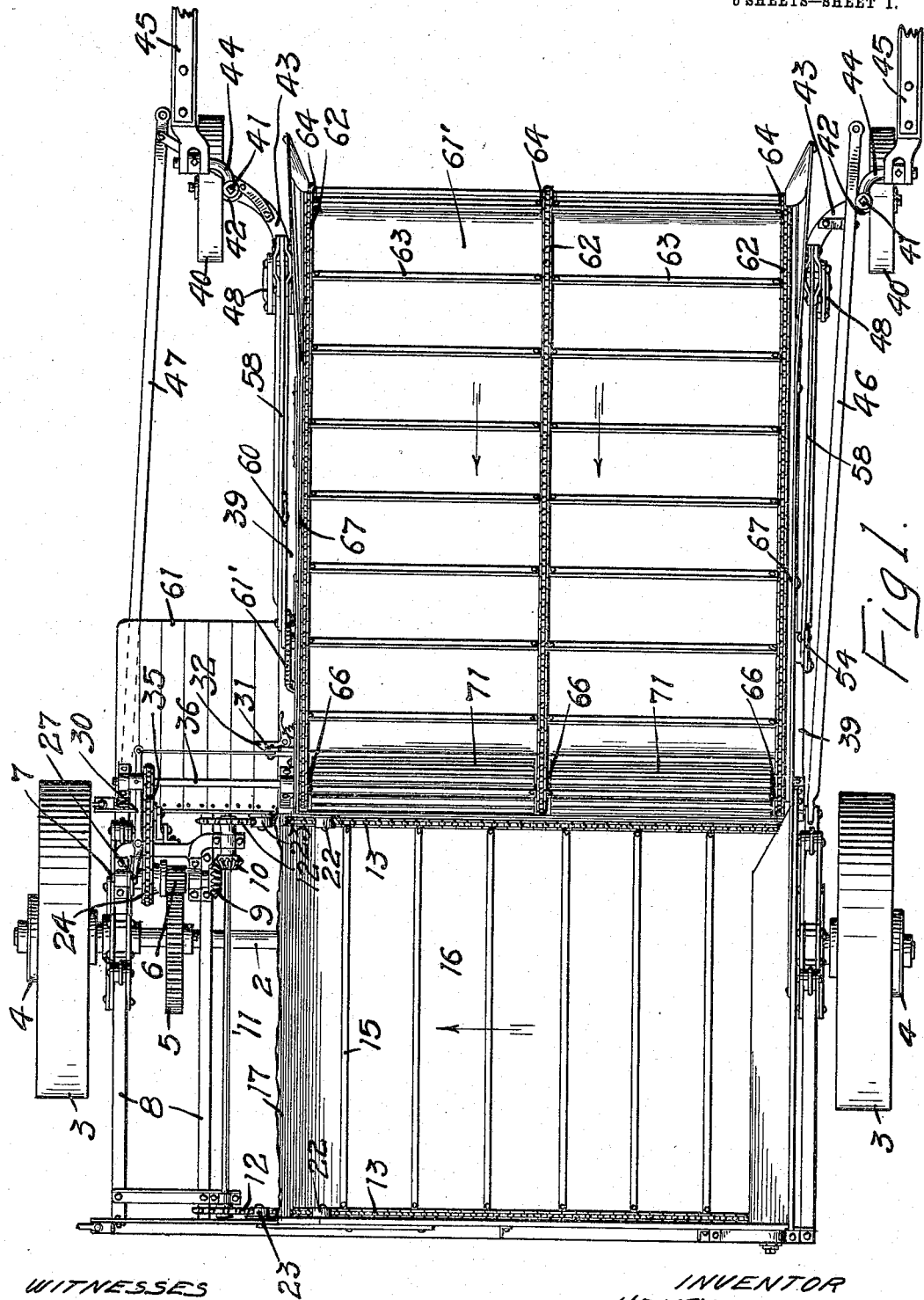

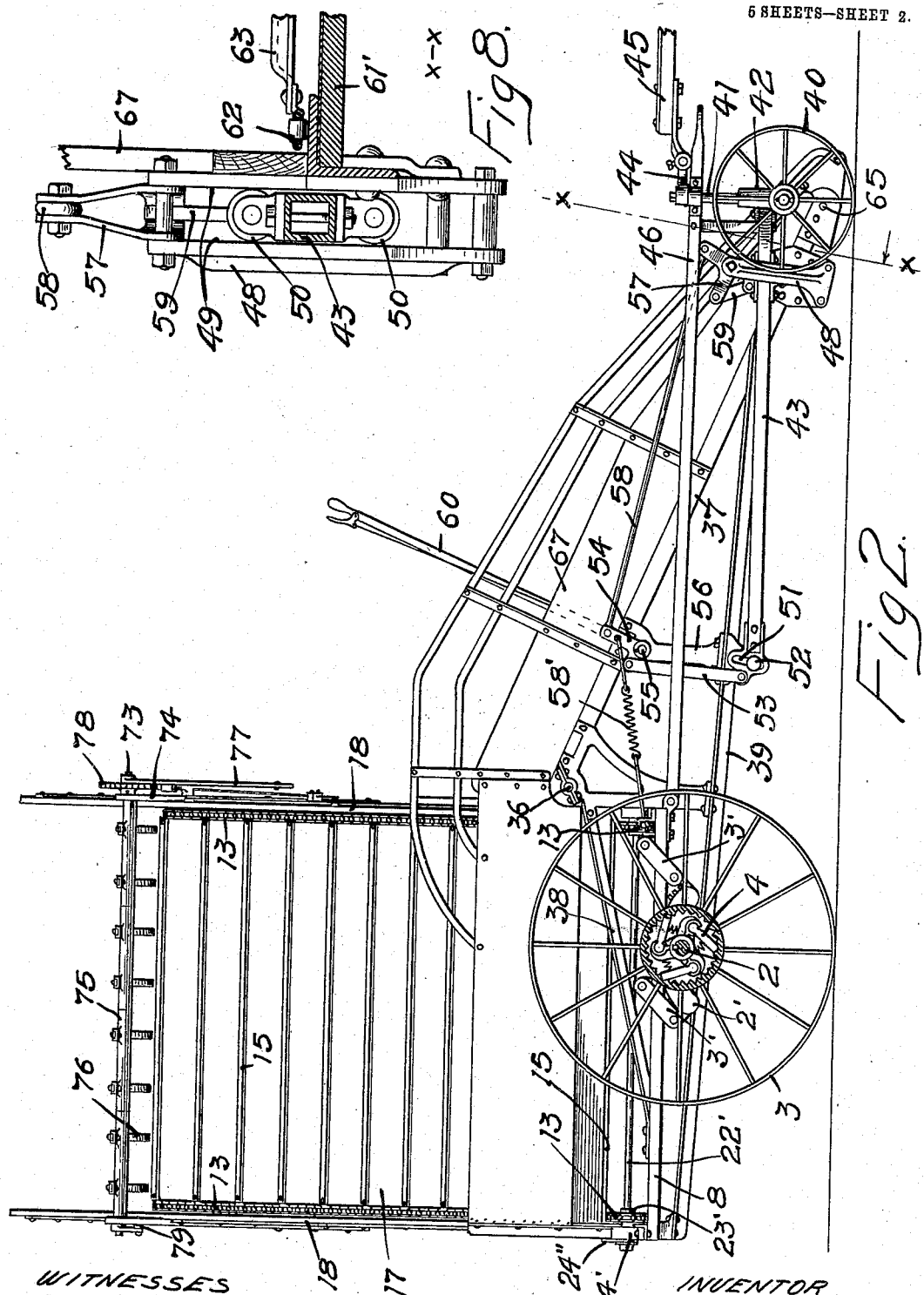

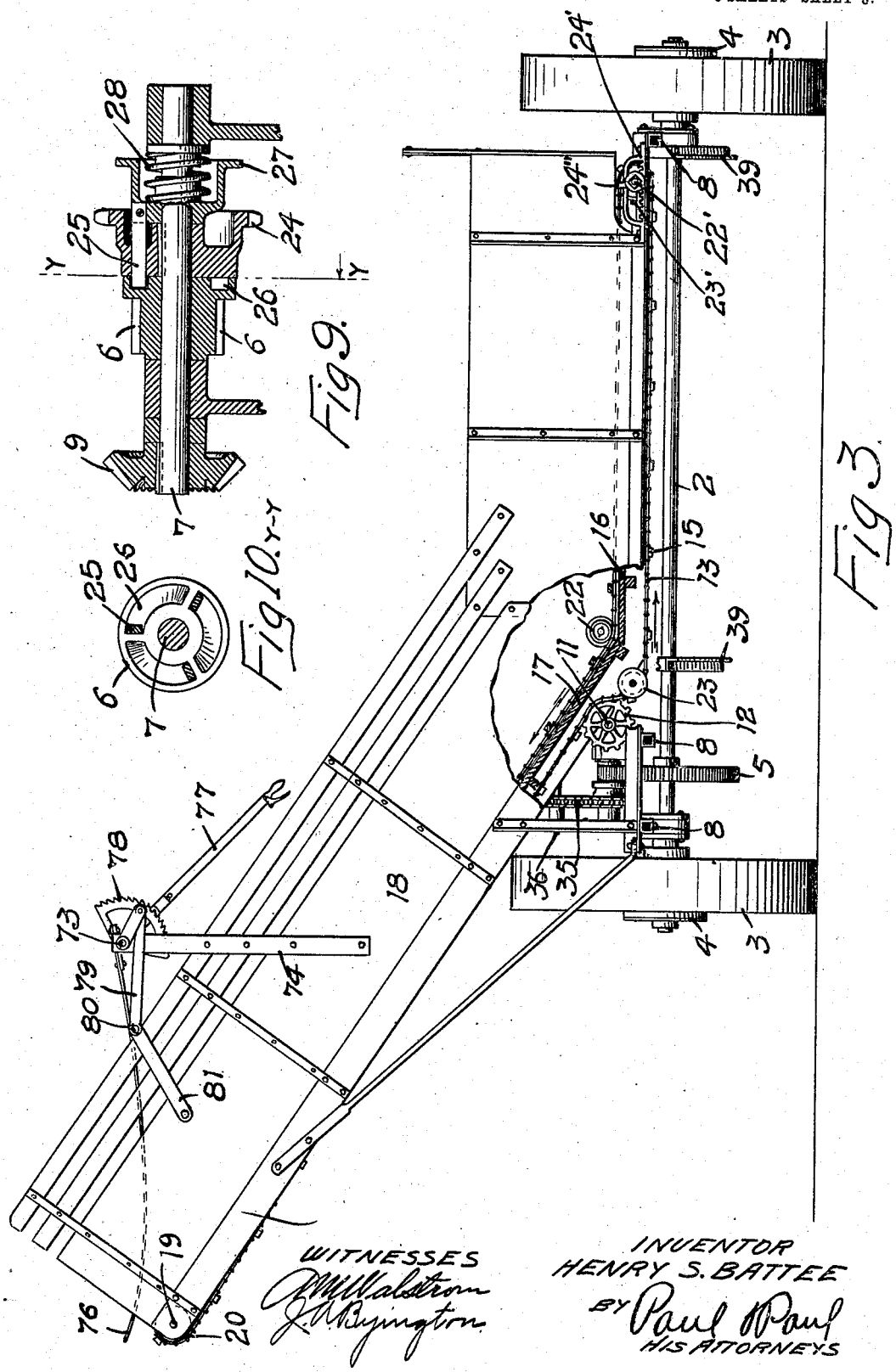

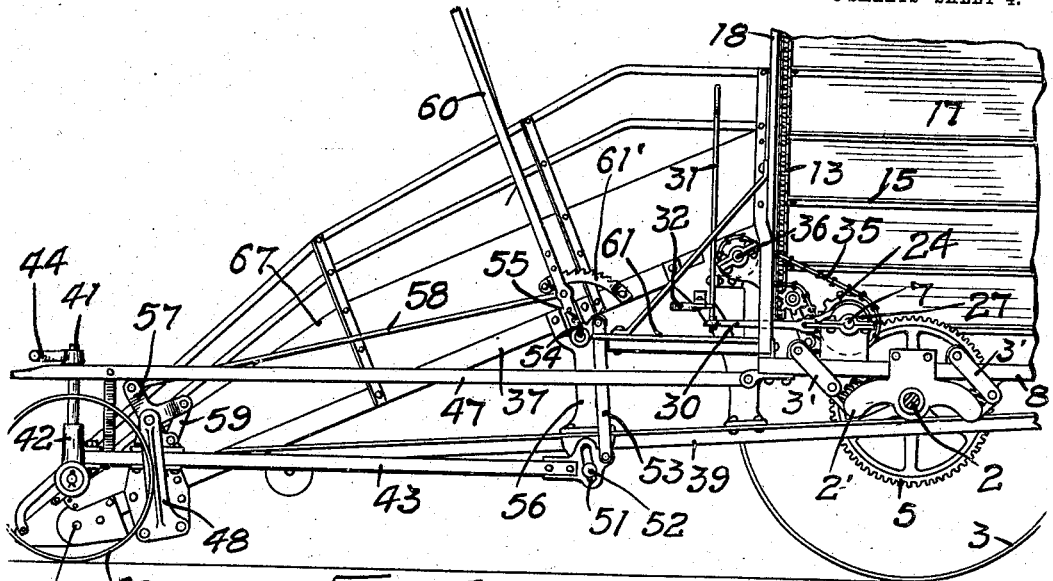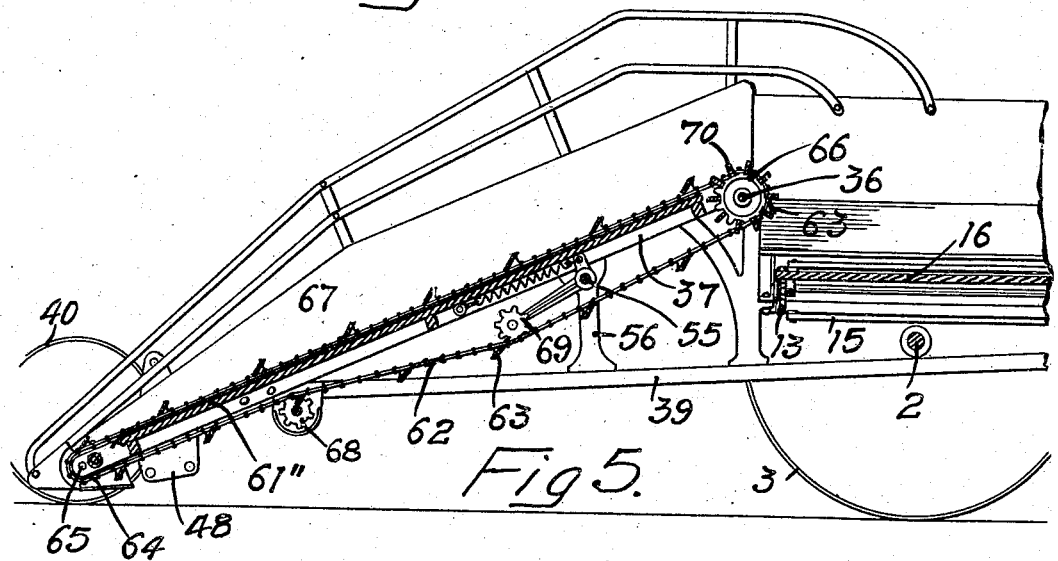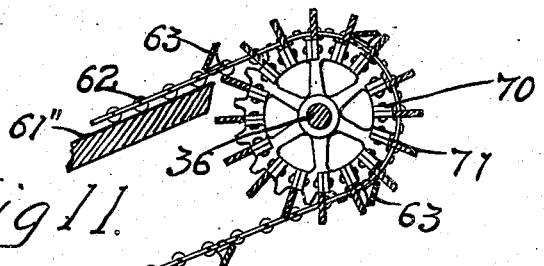

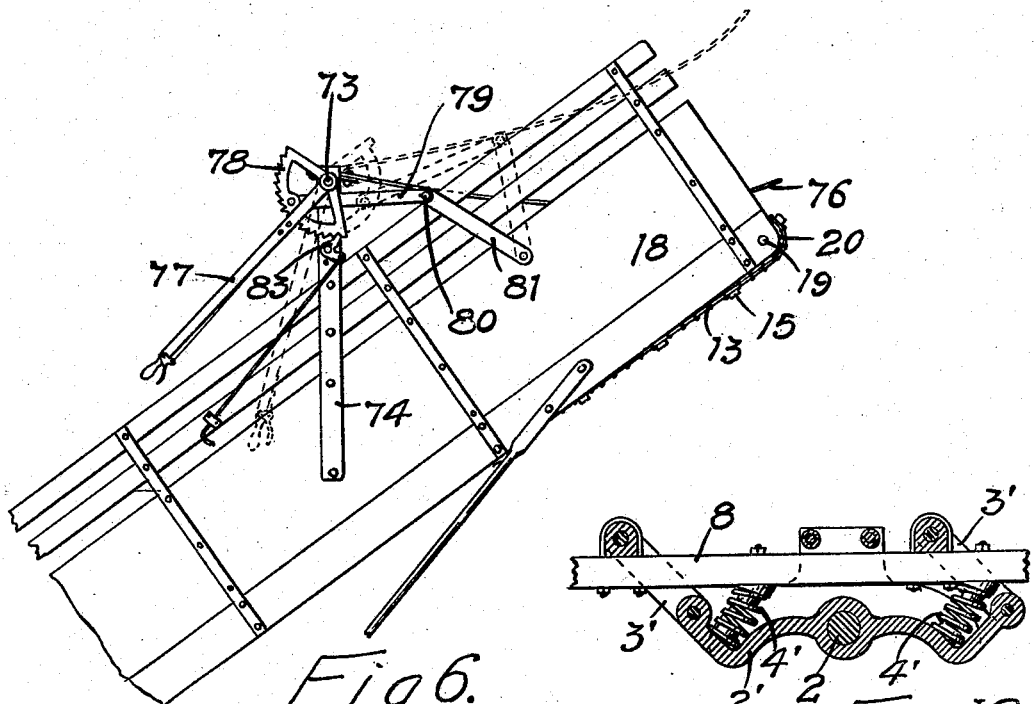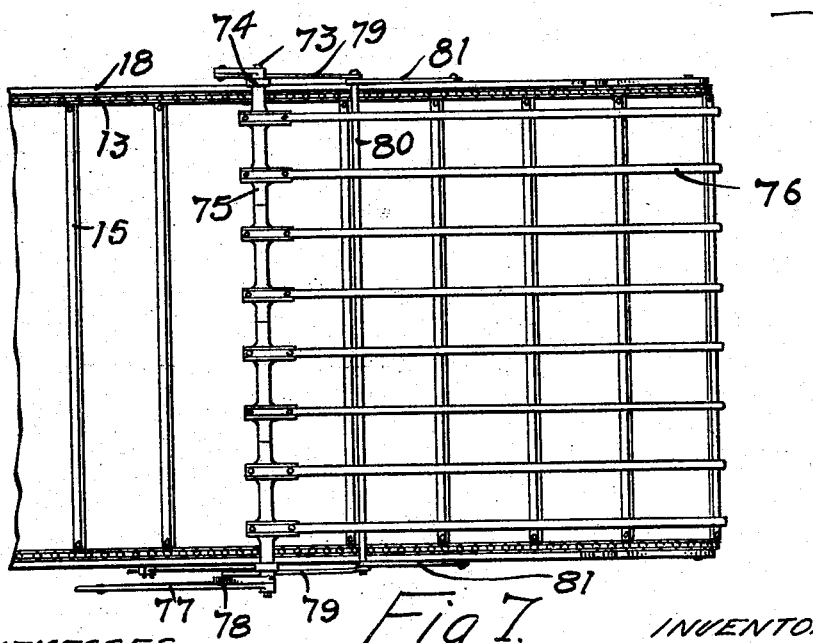

HENRY S. BATTEE, OF MINNEAPOLIS, MINNESOTA, ASSIGNOR TO SHOCK & HAY LOADER CO., OF MINNEAPOLIS, MINNESOTA, A CORPORATION OF MINNESOTA.

BUNDLE-LOADER.

No. 930,719.      Specification of Letters Patent.      Patented Aug. 10, 1909.

Application filed February 13, 1908. Serial No. 415,696.

*To all whom it may concern:*

Be it known that I, HENRY S. BATTEE, of Minneapolis, Hennepin county, Minnesota, have invented certain new and useful Improvements in Bundle-Loaders, of which the following is a specification.

My invention relates to machines for picking up bundles or sheaves of grain from the ground and loading on wagons or racks at the side of the machine, and the primary object of the invention is to improve the machines shown and described in Letters Patent of the United States issued January 16, 1906, No. 810,380 and February 19, 1907, No. 844,747 to Walter Gregory as trustee, the applications having been filed by John S. Richardson of Nowesta, North Dakota.

The invention consists in various constructions and combinations, all as hereinafter described and particularly pointed out in the claims.

In the accompanying drawings, forming part of this specification, Figure 1 is a plan view of a bundle loader embodying my invention. Fig. 2 is a side elevation of the same. Fig. 3 is a rear elevation, the wall of the machine being partially broken away to illustrate the side delivery elevator. Fig. 4 is a side elevation of the pick-up mechanism illustrating the apparatus for raising or lowering the same. Fig. 5 is a sectional view through the pick-up apron or carrier and a transverse elevator. Fig. 6 is a detail view illustrating the mechanism for operating the fingers at the discharge end of the side delivery carrier. Fig. 7 is a top view of the same. Fig. 8 is a sectional view on the line x—x of Fig. 2. Fig. 9 is a detail sectional view of the clutch mechanism by means of which the operation of the pick-up belt or apron is controlled. Fig. 10 is a sectional view on the line y—y of Fig. 9. Fig. 11 is a detail view illustrating the device for separating the bundles from the pick-up belt. Fig. 12 is a detail sectional view of the device arranged between the frame and the traction wheels for taking up the jar or shock when the machine is running over rough ground.

In the drawing, 2 represents an axle having traction wheels 3 each provided with the usual ratchet mechanism 4 generally employed in machines of this character. A gear wheel 5 is secured on the axle 2 and meshes with a pinion 6 on a stub shaft 7 that is journaled in bearings on a frame 8. The axle 2 is journaled at each end in a casting 2' having links 3' pivotally connecting it with the frame 8 and normally held out of contact with the frame by compression springs 4'. These springs are adapted to yield and allow the castings to rock and the axle to sway forward and backward as the wheels are running over rough ground, thus taking up the jar and shock and relieving the frame and mechanism of the machine of strain and possible damage.

A pinion 9 is secured on the stub shaft 7 and meshes with a similar pinion 10 on a shaft 11 provided with sprocket wheels 12 having belts 13 connected by cross bars 15 and adapted to slide over a horizontal floor 16 and an upwardly inclined continuation thereof 17 arranged within a frame 18. A shaft 19 has sprockets 20 at the opposite side of the frame from the sprockets 12 and at the upper end of the frame 18, around which the chains 13 are carried. Idle wheels 22 and 23 are arranged to hold the chain belts down upon the floor 16 and in engagement with their drive sprockets. The elevator shaft 22' on the opposite side of the machine from the shaft 11 has sprockets 23' loosely mounted thereon around which the elevator belts pass. In connection with this shaft 22' I provide a belt-tightening device consisting of rack bars 24' mounted in the frame of the machine on each side of the horizontal portion of the elevator and having their teeth in engagement with pinions (not shown), secured on the shaft 22'. The end of this shaft is adapted to receive a suitable crank for turning it and a dog 24" is provided to engage the teeth of the rack bar and lock the shaft in any desired position on the bar.

The pinion 6 is loose on its shaft and a sprocket 24 is keyed on said shaft, and pins 25 are arranged to slide through the sprocket 24 and enter sockets 26 in the pinion 6. The pins 25 are carried by a clutch member 27 and normally held in engagement with the recesses 26 by a spring 28, and a lever 30 is attached to an operating handle 31 that is locked by a spring-pressed latch 32. When the handle 31 is released the spring 28 will move the pins 25 into the recesses 26 and lock the pinion on its shaft. This release of the handle is effected by tripping the latch 32 which may be easily done with the knee or foot. When the handle is in its locked position the spring 28 will be under compression, the clutch member will be withdrawn and the pinion 6 will run idle. The bottoms of the recesses 26 are inclined as indicated in Fig. 10, so that in backing the machine the pins 25 will slide in said recesses without operating the pinion 6. The sprocket 24 has a driving belt connection 35 with a shaft 36 that is journaled in the frame 8 and also in a pick-up frame 37. This pick-up frame has a forward end adapted to travel near the ground and is provided with suitable braces 38 and 39 connecting it with the main frame of the machine. The tilting of this pick-up frame up or down tilts the main frame on the carrying axle.

Wheels 40 are mounted on studs 41 that are journaled in brackets 42 secured to the outwardly curved ends of bars 43. Cranks 44 are mounted on the studs 41 and provided with poles 45 for oscillating the wheels 40 and guiding the machine. Draft rods 46 and 47 are pivoted to the main portion of the frame and extend forwardly therefrom to points near the wheels 40, said draft rods having means for attachment to the draft eveners or doubletrees.

For the purpose of raising or lowering the pick-up frame on the guide wheels 40 to adapt it to the inequalities of the ground I provide housings 48 secured to the frame 37 and having guideways 49 for anti-friction wheels 50 mounted on the bars 43. A spring 58' connects one of the bell cranks 54 with the machine frame and normally tends to hold the bell cranks in position to raise the pick-up frame out of contact with the ground.

An operating lever 60 is secured on the shaft 55 within convenient reach of the operator on the platform 61 and by means of this lever the driver of the machine can oscillate the bell cranks 54 and 57 and raise or lower the forward end of the pick-up frame according to the character of the ground over which the machine is moving. Backward movement of the lever 60 will, through the bell cranks 57, apply pressure to the links 59 and to the bars 43, and through these bars to the wheels, and as the bars 43 supported by the wheels cannot be further depressed the housings 48 and the pick-up frame secured thereto will consequently be elevated, the degree of elevation depending, of course, upon the movement of the lever 60. Opposite or forward movement of the lever will produce a corresponding depression of the pick-up frame. A quadrant 61' is provided to be engaged by the usual latch device on the lever 60 for locking the lever in any desired position.

A floor 61'' is provided in the pick-up frame and a pick-up belt consisting of chains 62 and bars 63 connecting them, is arranged to operate over said floor and around sprockets 64 on pins 65 and similar sprockets 66 on the shaft 36. The bars of this pick-up belt move close to the ground line and work in under the bundles of grain or loose grain or hay and gather up the material as the machine moves over the field. I have found that these pick-up bars are very effective and will readily adapt themselves to the inequalities of the ground. Side boards 67 are provided on the pick-up frame to direct the bundles gathered up, back to the horizontal portion of the side delivery elevator. Idle sprockets 68 are provided on the under side of the pick-up frame and a belt-tightener 69 is arranged to take up the slack in the pick-up belt. The bars 63 are inclined slightly with respect to the belts whereon they are mounted, and upon the shaft 36 I arrange reels 70 having blades 71 with spaces between them to receive the bars 63 and strip off the bundles of grain and insure their separation from the pick-up carrier. At the discharge end of the side delivery frame I arrange a cross shaft 73 supported on brackets 74 and carrying a series of collars 75 whereon curved fingers 76 are secured. These fingers project forwardly above the upper end of the elevator and prevent the bundles when they reach the discharge end of the elevator from falling or being blown backwardly by the wind and retarding the delivery to the wagon. The weight of the fingers holds the bundles down upon the carrier and insures the continuous delivery of the bundles to the wagon.

For the purpose of operating the fingers to raise or lower them I provide a lever 77 on the shaft 73, and a toothed quadrant 78 is connected by links 79 with a cross rod 80 upon which the fingers rest. Links 81 connect the cross rod 80 with the side boards 18 of the elevator frame. A dog 83 is arranged to engage the teeth of the ratchet 78 to lock it in any desired position. By oscillating the lever the operator can raise or lower the fingers and render them operative or inoperative as desired.

I claim as my invention:

1. In a bundle loader, the combination with a frame, of a pick-up mechanism including a series of cross slats and a reel having bars with spaces between them to receive said slats, substantially as described.

2. In a bundle loader, the combination, with a main frame having carrying wheels, of a pick-up frame secured to said main frame and projecting forwardly therefrom and adapted to swing vertically on the axle of said main frame as a pivot, a pick-up belt mounted in said forwardly projecting frame and including a series of cross slats and belts therefor, said cross slats operating close to the ground line and adapted to work in under and pick up the grain, or hay, the oscillation of said pick up frame with said main frame allowing said slats to follow the inequalities of the ground.

3. In a bundle loader, pick-up mechanism consisting of a flexible carrying means having cross slats arranged to pick up the bound bundles, and means at the discharge end of said carrying means having bars with spaces between them to receive said slats and adapted to disengage the bundles therefrom.

4. In a bundle loader, pick-up mechanism comprising flexible carrying means and a reel operating near the upper end of said carrying means and having bars with spaces between them to receive said flexible carrying means and adapted to disengage the bundles therefrom.

5. In a bundle loader, pick-up mechanism comprising flexible carrying means having cross bars or slats thereon, and a reel operating near the upper end of said carrying means, and having bars with spaces between them to receive the slats of said carrying means, for the purpose specified.

6. In a bundle loader, the combination, with a main frame having carrying wheels, of a pick-up frame secured to said main frame and projecting forwardly therefrom and adapted to swing vertically with said main frame on said carrying wheel axle, a flexible pick-up means mounted in said pick-up frame and comprising belts and cross slats between them, said slats being arranged to operate close to the ground line and work in under the grain or hay, and the oscillation of said pick-up frame with said main frame allowing said slats to follow the inequalities of the ground, and means arranged to disengage the grain or hay from said carrying means.

7. In a bundle loader, the combination, with a main frame and carrying wheels therefor, of a pick-up frame projecting forwardly from said main frame, a pick-up mechanism operating in said pick-up frame, and means for raising or lowering the forward end of said pick-up frame and tilting said main frame on its supporting wheels to adjust the forward end of said pick-up frame vertically, substantially as described.

8. The combination, with a main frame having carrying wheels, and a pick-up frame projecting forwardly therefrom, of guide wheels supporting the forward end of said pick-up frame, a flexible carrying means operating in said pick-up frame, and means mounted on said pick-up frame and connected with said guide wheels whereby the forward end of said pick-up frame may be raised or lowered.

9. The combination, with a main frame and carrying wheels therefor, of a pick-up frame projecting forwardly therefrom, bars connected to said pick-up frame at their rear ends and extending forwardly on each side of said frame and wheels mounted on the forward ends of said bars, mechanism mounted on said pick-up frame and pivotally connected with said bars, and means for operating said mechanism to raise or lower said pick-up frame.

10. The combination, with a main frame and carrying wheels, of a pick-up frame projecting forwardly therefrom, a flexible pick-up mechanism operating in said frame, bars projecting forwardly on each side of said pick-up frame, guide wheels swiveled on said bars, housings mounted on said pick-up frame, bell cranks mounted on said housings and pivotally connected with said bars, and means for oscillating said bell cranks to raise or lower said pick-up frame.

11. The combination, with a main frame and carrying wheels, and a pick-up frame projecting forwardly from said main frame, of bars mounted on said pick-up frame on each side thereof, studs journaled on said bars and guide wheels mounted on said studs, draft rods attached to said main frame and extending forwardly therefrom near said bars, guiding poles mounted on said studs by means of which said studs may be oscillated to turn said wheels and guide the machine and a flexible carrying mechanism operating in said pick-up frame.

12. The combination, with a main frame and carrying wheels and a pick-up frame projecting forwardly therefrom, wheels provided on each side of said pick-up frame, mechanism connected with said pick-up frame and with said wheels, whereby said frame may be raised or lowered, an operating lever connected with said raising and lowering mechanism, and a platform arranged in front of said main frame and near said operating lever, substantially as described.

13. The combination, with a main frame and carrying wheels, and a pick-up frame projecting forwardly therefrom, of bars having a sliding connection at their rear ends with said pick-up frame, wheels swiveled on the forward ends of said bars, housings mounted on said pick-up frame, bell cranks mounted in said housings, and pivotally connected with said bars, a shaft, bell cranks secured thereon, links connecting said bell cranks with the rear ends of said bars and rods connecting said shaft bell cranks with said first named bell cranks, and a lever mechanism for oscillating said bell cranks and raising or lowering said pick-up frame.

14. In a bundle loader the combination, with a main frame, having an axle and carrying wheels on which said frame is adapted to oscillate, and said main frame having a forwardly projecting pick-up frame and a flexible pick-up mechanism operating in said pick-up frame and means for tilting said main frame and pick-up frame on said carrying wheels to raise or lower the receiving portion of said pick-up mechanism.

15. In a bundle loader, the combination, with a main frame having an axle and carrying wheels therefor, and a pick-up mechanism projecting forwardly from said main frame and adapted to gather up the bound bundles, and mechanism for tilting said pick-up mechanism and said frame on said carrying wheels to raise or lower the forward portion of said pick-up mechanism.

In witness whereof, I have hereunto set my hand this 1st day of February 1908.

HENRY S. BATTEE.

Witnesses:
RICHARD PAUL,
J. A. BYINGTON.